US012780139B2

(12) United States Patent
Johnson

(10) Patent No.: US 12,780,139 B2

(45) Date of Patent: Nov. 3, 2026

(54) BULLET-PROOF PROTECTIVE COVERING FOR A BABY CAR SEAT

(71) Applicant: Debra Sharon Johnson, Dallas, GA (US)

(72) Inventor: Debra Sharon Johnson, Dallas, GA (US)

( * ) Notice: Subject to any disclaimer, the term of this patent is extended or adjusted under 35 U.S.C. 154(b) by 404 days.

(21) Appl. No.: 18/125,943

(22) Filed: Mar. 24, 2023

(65) Prior Publication Data

US 2023/0322175 A1 Oct. 12, 2023

Related U.S. Application Data

(60) Provisional application No. 63/323,524, filed on Mar. 25, 2022.

(51) Int. Cl.

*B60R 21/12* (2006.01)

*B60N 2/28* (2006.01)

(Continued)

(52) U.S. Cl.

CPC ............ *B60R 21/12* (2013.01); *B60N 2/2839* (2013.01); *F41H 1/02* (2013.01); *B60R 2021/0002* (2013.01); *B60R 2021/006* (2013.01)

(58) Field of Classification Search

CPC ...... B60R 21/12; B60N 2/267; B60N 2/2839; B60N 2/0022; F41H 1/02

See application file for complete search history.

(56) References Cited

U.S. PATENT DOCUMENTS 3,581,620 A * 6/1971 Hauck ..................... B32B 17/04 89/36.11

3,855,898 A 12/1974 McDonald (Continued)

FOREIGN PATENT DOCUMENTS

CN 106394340 A * 2/2017

KR 20140126908 A * 11/2014

(Continued)

*Primary Examiner* — Timothy J Brindley

(57) ABSTRACT

A method and an apparatus/assembly provides enhanced protection to a baby in a child safety car seat. A bullet-proof child seat apparatus (BCSA) having a central segment that includes a seat portion and a backrest portion with a shapeable and adjustable headrest is constructed using bullet-proof covering that includes a protective blanket. Adjacent to the central segment are shapeable first and second side segments, each having a collar portion at an upper end and a side panel portion extending downward and away from the collar portion. The BCSA protects a baby fastened in place within the central segment by an enclosing bullet-proof blanket moldable around a baby's face, an outer bullet-proof material and/or a structure/chassis having a bullet-proof composition. The covering and structure provides complete protection from side to side while side segments can be pulled inward to provide added protection from a frontal direction and particularly to the head and face of a baby whose body is protected in the front by firmly extended flaps of the blanket. The BCSA also includes an infant risk tracking and reporting (IRTR) module that provides further protection by using sensors to track and report a baby's presence and surrounding environment.

18 Claims, 8 Drawing Sheets

(51) Int. Cl.
*F41H 1/02* (2006.01)
*B60R 21/00* (2006.01)

(56) References Cited

U.S. PATENT DOCUMENTS 5,164,536 A * 11/1992 Barbaza ............ B64D 11/0689 89/36.02
5,294,166 A 3/1994 Shapland
5,441,331 A 8/1995 Vento
5,448,938 A 9/1995 Fernandez et al.
5,811,719 A 9/1998 Madden, Jr.
6,073,884 A * 6/2000 Lavergne ................ F41H 7/046 89/36.11
6,161,462 A 12/2000 Michaelson
6,164,181 A 12/2000 Bruner
6,481,782 B2 11/2002 Bond
7,070,242 B2 * 7/2006 Mears ....................... F41H 5/08 297/452.12
7,270,377 B2 9/2007 Schmitz et al.
7,389,718 B1 6/2008 Carter et al.
7,493,844 B2 2/2009 Martin
7,980,166 B1 * 7/2011 Fuqua ....................... F41H 5/24 86/50
8,087,341 B2 1/2012 Adler
8,210,088 B1 * 7/2012 Keyfauver ................ F41H 5/08 89/918
8,500,186 B2 * 8/2013 Warren ..................... F41H 5/26 296/97.5
8,656,822 B1 2/2014 Saucedo
10,112,509 B1 * 10/2018 Robertson ............ B60N 2/2884
11,433,781 B1 * 9/2022 Polosajian ............. B60N 2/267
2007/0268119 A1 11/2007 Cram et al.
2010/0107861 A1 5/2010 Carter
2012/0248837 A1 * 10/2012 Peters ....................... F41H 5/08 89/36.02
2015/0338193 A1 * 11/2015 Walker ...................... F41H 1/02 89/36.02
2016/0107552 A1 4/2016 Wakeman
2017/0240022 A1 * 8/2017 Ireri ....................... A61B 5/113
2022/0221253 A1 * 7/2022 Labock ................... B60R 21/12
2022/0343750 A1 * 10/2022 Wright ............... G08B 21/0236

FOREIGN PATENT DOCUMENTS

KR 20190000880 A * 1/2019
WO 2009007972 A2 1/2009
WO 2010130453 A1 11/2010
WO 2012062234 A1 5/2012

* cited by examiner

BULLET-PROOF PROTECTIVE COVERING FOR A BABY CAR SEAT

CROSS-REFERENCE TO RELATED APPLICATION

This application claims priority to U.S. Provisional Patent Application No. 63/323,524 filed Mar. 24, 2022, the entirety of which is incorporated by reference.

FIELD OF THE INVENTION

The present invention relates generally to child safety car seats, and more particularly, to bullet-proof child safety car seats.

BACKGROUND OF THE INVENTION

A child/infant safety car seat is a seat designed specifically to protect children from injury or death during vehicle collisions. Most commonly these seats are purchased and installed by car owners, but car manufacturers may integrate them directly into their vehicle's design and may be required to provide anchors and ensure seat belt compatibility. Furthermore, many jurisdictions require children defined by age, weight, and/or height to use a government approved child safety seat with proper restraints when riding in a vehicle.

A number of safety standards for fixing and tethering/fastening car seats into different makes of car have been established. In addition, safety regulations that provide added protection, including regulations that specify rearward facing travel for younger children have been introduced. Over the years, child safety with respect to automobile accidents has received a significant degree of technological and regulatory focus and attention. As a result, a substantial number of safety standards and regulations have been directed towards mitigating harm to a baby during vehicle accidents.

While a significant focus has been directed towards reducing harm to a child during accidents, a much smaller focus has been placed on mitigating risks to a transported child due to other hazards which can be non-crash related or indirectly related to a collision/crash. For example, although kidnappings continue to pose a high risk to a significant number of infants, there has been far less technological focus placed on developing systems to mitigate the risks of infant kidnapping from a vehicle.

Quite commonly, a number of infants die each year as they are left unattended in vehicles in the scorching sun. In some cases, parents/guardians either forgot these children and/or became pre-occupied in some way with activities and/or thoughts. At other times, parents/guardians become incapacitated due to accidents, illnesses and other unforeseen reasons that prevent them from caring for the infant.

Another potentially fatal hazard to a child being transported in a vehicle is the threat posed by drive-by shootings. In fact, a rising number of infants injured or killed in vehicles by bullets resulting from drive-by shootings has been identified in certain cities for several years. However, as described previously, much less regulatory and technological focus has been placed on these types of hazards/dangers to a child being transported within a vehicle or other source of transportation.

Ideally, it would be extremely useful to provide a child safety system that provides protection against a diverse set of hazards which can include accidents, kidnapping, stray bullets, overheating and suffocation. In addition, the system should be able to track a safety status and an environment of the child once the child is placed in a vehicle.

Accordingly, there is need for a hazard tracking and mitigation solution that provides protection from various physical and/or environmental hazards and facilitates effective proactive responses that can be expected to prevent injury or even death to an infant.

SUMMARY OF THE INVENTION

The present invention is directed to a method and an apparatus/assembly for providing bullet-proof protection to a baby in a child safety car seat. A bullet-proof child seat apparatus (BCSA) having a central segment that includes a seat portion and a backrest portion with an adjustable headrest is constructed using bullet-proof covering that includes a protective baby blanket. Adjacent to the central segment are shapeable first and second side segments, each having a collar portion at an upper end and a side panel portion extending downward and away from the collar portion. The BCSA protects a baby fastened in place within the central segment by an enclosing bullet-proof blanket moldable around a baby's face, an outer bullet-proof material and/or a structure/chassis having a bullet-proof composition. The covering and structure provides complete protection from side to side and from the back and the front while side segments can be pulled inward to provide added protection from a frontal direction and particularly to the head and face of a baby whose body is protected in the front by firmly extended flaps of the blanket. The BCSA also includes an infant risk tracking and reporting (IRTR) module that provides further protection by using sensors to track and report a baby's presence and surrounding environment.

According to some embodiments, the IRTR module/utility identifies hazards/dangers to a child based on sensor data and/or timestamp information. According to some embodiments, the IRTR module sends an alert triggered by a detected hazard/danger to a selected entity.

According to some embodiments, the IRTR module receives trip information including one or more of an expected start time, an arrival time, location information and an expected presence/absence of a child/baby. According to a related aspect, the IRTR module utilizes received trip data and/or information about a child's expected location/presence to provide reminders/alerts to a selected individual.

Bullet-Proof Protective Covering for a Baby Car Seat

Although the invention is illustrated and described herein as embodied in a BULLET-PROOF PROTECTIVE COVERING FOR A BABY CAR SEAT, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
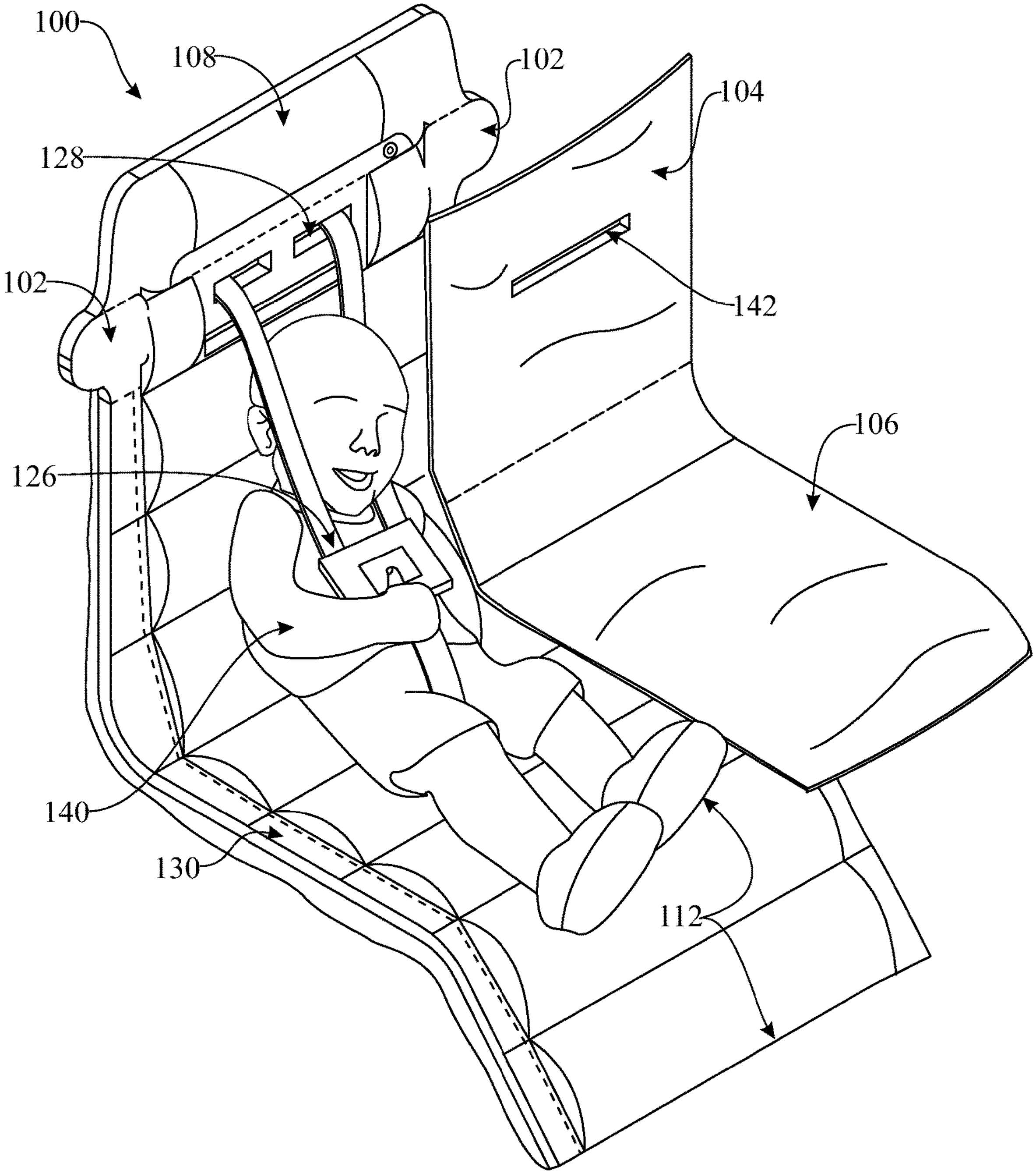
FIG. 1 illustrates a view of a child fastened within a bullet-proof child seat apparatus (BCSA), according to one or more embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Shown throughout the figures, the present disclosure is directed toward providing bullet-proof protection to a child in an enhanced child safety seat apparatus in the form of a child safety car seat and further protection by using sensors to track and report a baby's presence and surrounding environment.

Figure 2:
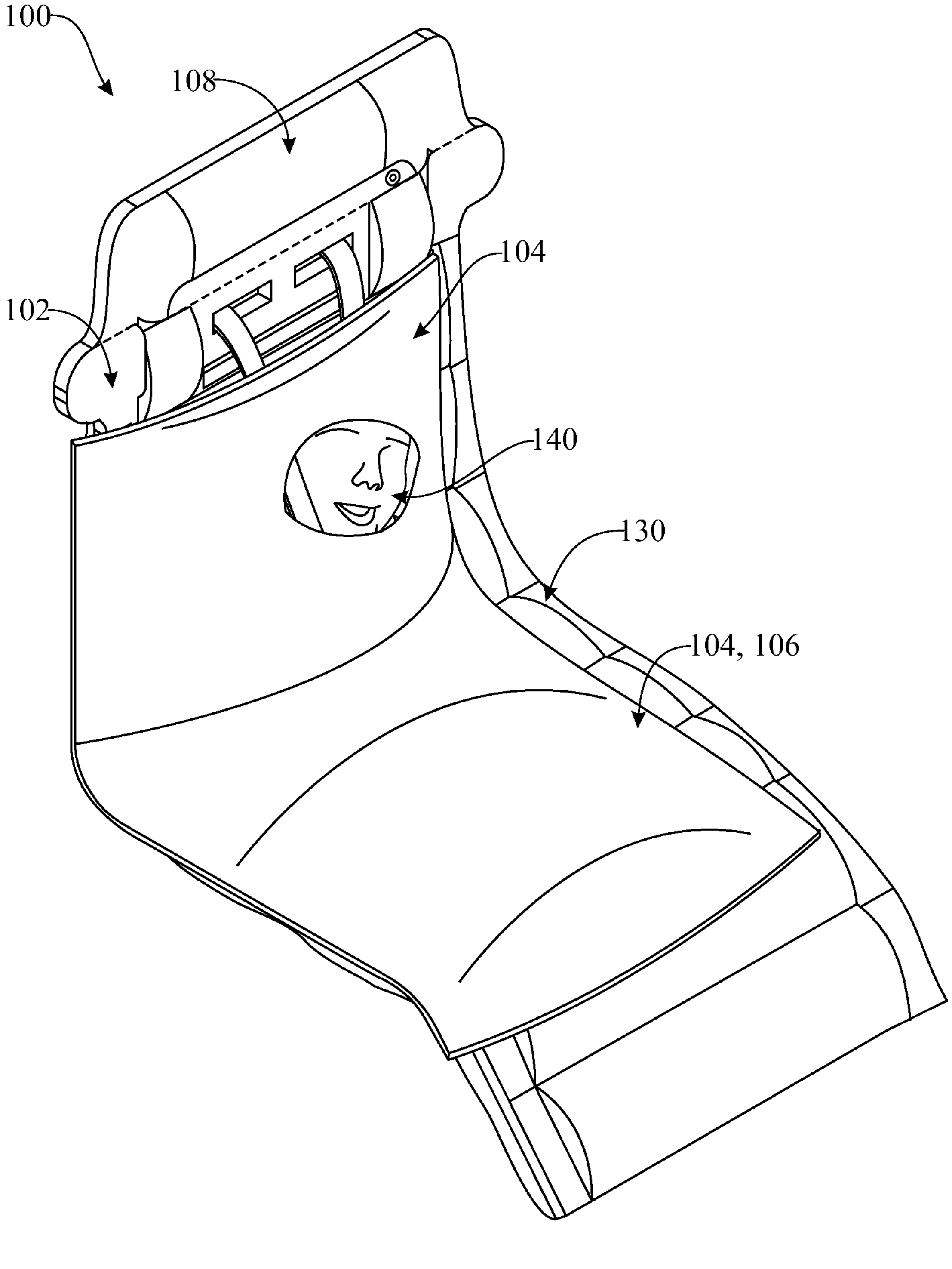
FIG. 2 illustrates a view of the child covered by protective flaps of the bullet-proof blanket within the BCSA, according to one or more embodiments.
Figure 3:
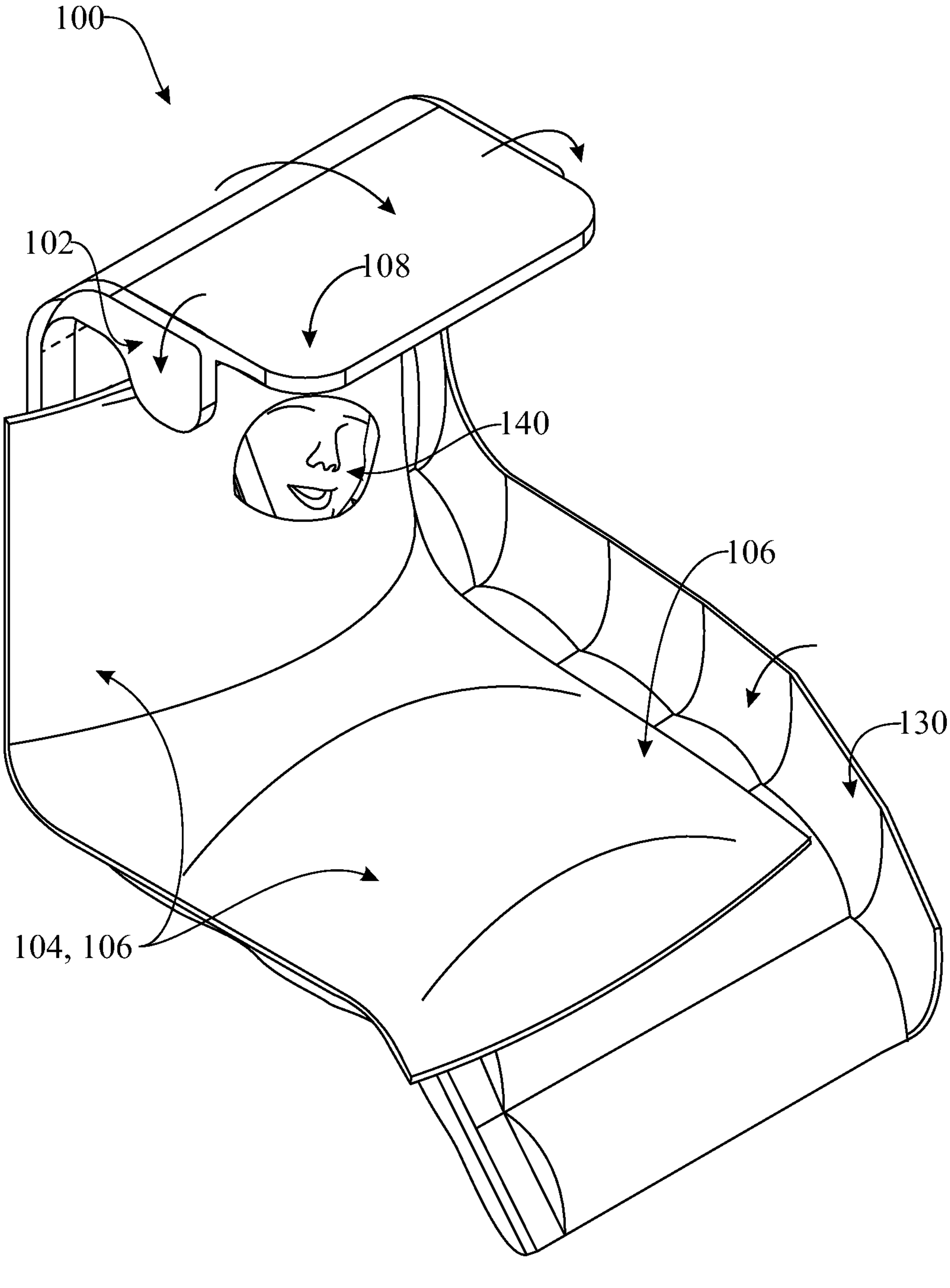
FIG. 3 presents an example illustration of the BCSA in which the headrest and the collar have been adjusted to provide greater protection coverage for the baby's head, according to one or more embodiments.
Figure 4:
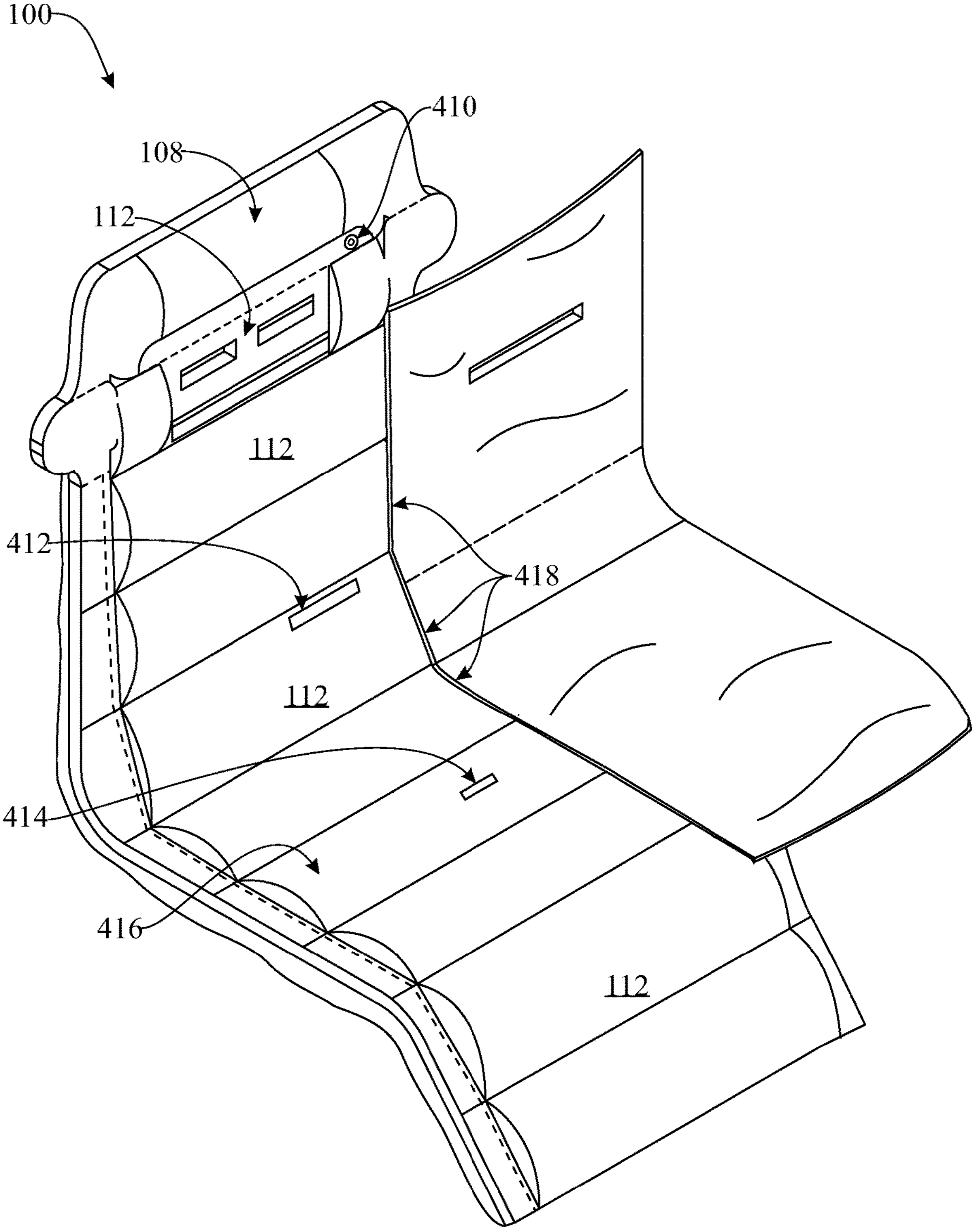
FIG. 4 presents an example illustration of the BCSA having a number of sensors for tracking a baby's behavior, presence, and environment, according to one or more embodiments.

With reference now to the figures, and beginning with FIG. 1 and likewise referencing FIGS. 2-4 as well, there is depicted a view of a child fastened within a bullet-proof child seat apparatus (BCSA) 100, according to one or more embodiments. A BCSA 100 is a child safety car seat that incorporates a bullet-proof blanket and/or an external bullet-proof covering. The bullet proof blanket has a fixed portion 416*a* that is attached to the chassis of the seat apparatus 100. A free portion 416*b* is attached to the fixed portion 416*a* along a seam 418. FIG. 2 illustrates a view of a child covered by protective flaps 104, 106 of the bullet-proof blanket's free portion 416*b* within the BCSA, according to one or more embodiments. The BCSA 100 comprises a central segment 112 that includes a lower/seat portion and an upper/backrest portion with a shapeable and/or adjustable headrest 108 that can be adjust to provide a protective coverage area around the head of the child. Adjacent to the central segment 112 are shapeable first and second side segments, each having a collar portion 102 at an upper end and a side panel portion 130 extending downward and away from the collar portion 102. As previously described, the BCSA 100 also includes a bullet-proof protective baby blanket made of a fixed portion 416*a* and a free portion 416*b*. The free portion 416*b* includes an outer/upper flap 104 and an inner/lower flap 106. Also illustrated are seat belts 129 and fasteners 126 which are pulled through holes 128 within the BCSA 100. A face opening 142 in the free portion 416*b* provides an opening within the blanket material by which a protective flap (e.g., the upper flap 104) can be molded/shaped around the child's face.

According to some embodiments, a face opening can also be achieved by wrapping the separate upper and lower flaps so that the lower periphery of the upper flap and the adjacent, upper periphery of the lower flap both initially cover an area that is close to the child's face. For example, the lower periphery of the upper flap 104 can extend around the child from above the neck or chin and the adjacent, upper periphery of the lower flap can extend around the child from below the neck or chin. The selective wrapping/positioning of the flaps provide an opening that can then be used to shape or mold the flaps around the child's face.

According to some embodiments, a bullet-proof protective baby blanket 416*a*, 416*b* and the central segment 112 are stitched/sewn together providing a seam 418 (FIG. 4) proximate to a side edge of the central segment 112. A back side of the fixed portion 416*a* lies atop a base chassis covering and behind a child's back when a child 140 is properly positioned with his back towards and/or adjacent to the central segment 112. The free portion 416*b* of the blanket comprises the outer/upper flap 104 and the inner/lower flap 106 which are both used to cover the front of the child 140. The material of the bullet proof blanket can be a multi-layered para-aramid material fiber construction that includes cushioning layers between para-aramid layers. The para-aramid can be a material known by the trade name KEVLAR. In some embodiments, the fixed portion 416*a* and the free portion 416*b* can further include lightweight ceramic ballistic resistant plates in between the para-aramid and cushioning layers.

According to some embodiments, both the upper and lower flaps 104, 106 having attached/stitched ends extend from the seam 418 (FIG. 4) and around a front of a child's torso to cover/protect the front region of a child that is properly positioned with his back towards and/or adjacent to the central segment 112.

The loose ends of the flaps 104, 106 can include a first complementary component of a securing/locking mechanism including one or more of magnet components, a hook, a loop, a clasp, magnetic closure, hook & loop-based closure and some other first complementary component. A second complementary component of the securing/locking mechanism can be positioned on a side panel portion of the side segment or some other region to enable the flaps to provide a fully and/or firmly extended covering around a front region of the baby's body.

According to some embodiments, bullet-proof blankets with diverse styles/types of securing/locking mechanisms can be incorporated within a BCSA 100. For example, a blanket can be one or more of a single flap blanket, a multi-flap blanket, a zipper-based blanket, a button-based blanket and any other blanket with a different or hybrid locking mechanism to attach the free portion 416*b* to the fixed portion 416*a* along the sides opposite the seam 418.

According to some embodiments, separate bullet-proof flaps can be securely attached to an interior of a vehicle's rear doors (adjacent to the BCSA 100) to provide protection to the BCSA 100 from bullets potentially shot from the side of the car. One or more bullet-proof flaps can be used to cover the back seat of the vehicle.

According to some embodiments, protective bullet proof flaps can be used to provide additional protection to a child and the child's environment. These protective flaps can be securely placed against one or more of rear side windows as protective curtains, top/roof interior of the vehicle, and interior door panels. In addition, bullet-proof flaps can be placed over various seats or segments of seats in the front and/or rear of the vehicle. According to another aspect, lower flap(s) integrated into the BCSA 100 can be designed to provide protection for a child's legs. Any of these protective bullet-proof flaps can be implemented as a single or multi-layer covering.

According to some embodiments, a child placed in the BCSA 100 is secured in place by the fasteners in the car seat. The fixed portion 416*a* of the blanket or seat covering lays on top of or adjacent to an underlying structure/chassis and/or base material layer of the BCSA 100. The openings 128 for the straps allow the BCSA 100 to secure the baby in place. The side segments 130 of the BCSA 100 can include moldable wires or boning components incorporated within the bullet-proof material of the collar 102 and side panel 130 portions that allow the collar 102 and side panel 130 portions to be shapeable/moldable. Thus, the side panels portions 130 can be moved between a lowered positioned where they are flat/parallel to the central segment 112 surface, or they can be raised to as to extend outward perpendicularly to the surface of the central segment 112 in a raised position. According to some embodiments, the collar portion 102 can be either an attachable/modular component or a built-in structural component of the BCSA 100. According to some embodiments, the collar portion 102 can be an extension of the blanket and/or set covering. According to some embodiments, the collar portions 102, the headrest 108 region and an adjacent upper backseat region collectively provide an extended upper region of the BCSA 100 that can be shaped to surround a child to provide a greater protection coverage area and, as a result, increased protection for the child.

According to some embodiments, the collar 102 is integrated with the headset region to provide one continuous region that extends around the top portion of the BCSA 100.

The integrated continuous collar/headset region can blend into the rest of the moldable side segments making it one continuous piece to pull up and cover more of the neck and face area of the child/infant. The BCSA 100 can be designed having the collar region 102 separate and distinguishable from the headset region. In some embodiments the BCSA 100 can be designed with an integrated collar and headset region.

According to some embodiments, the BCSA 100 is a modular apparatus comprising a base child safety car seat or chassis 150 which provides a structural base for the BCSA 100. The chassis 150 can be made of plastic or any other suitably rigid material, and can include ballistic resistant material including steel, ceramic plate(s), para-aramid layers, or combinations thereof. A replaceable bulletproof covering is placed over the structural base/chassis 150. According to some embodiments, the sensors can be incorporated within or attached to the replaceable bullet-proof covering. According to some embodiments, one or more components of the device 400 can be attachable to the replaceable bullet-proof covering and/or the base child safety car seat. According to some embodiments, the base child safety car seat comprises a chassis component 150 and a chassis covering component(s) 416*a*, 416*b*. According to some embodiments, the BCSA 100 can be designed to provide bullet-proof protection in any of the one or more internal chassis components and/or the external chassis covering components. According to some embodiments, modular bullet-proof structural/chassis components can be incorporated within the base child safety car seat to provide greater bulletproof protection capabilities for the modular BCSA 100.

According to some embodiments, the bullet-proof blanket is moldable to the baby's face to provide an optimally sized opening for the child's face. According to some embodiments, some parents may prefer to manipulate/adjust the blanket to provide a sunflower-like face opening. According to some embodiments, some parents may wish to adjust the collar portion so that the collar portion remains substantially linear with and/or in a same plane as the central portion. Alternatively, the collar portion can be pulled in closer to the infant or child. The ability to mold the blanket and adjust the collar portion provides flexibility to meet the comfort and safety needs of children of various sizes, ages, and activity levels. According to some embodiments, the moldable bullet-proof blanket is breathable.

According to some embodiments, the BCSA 100 can be configured/arranged as a rearward facing child safety car seat. In some jurisdictions, a younger (e.g., a child less than 15 months old) infant/child must be placed in a rearward facing child safety car seat. A strap with a buckle or fastener attaches around the headrest or around the back of the central region to secure the rearward facing BCSA 100 by which the baby now faces the trunk or approaching traffic. One or more holes 128 in the bullet-proof covering allow the seat belts 129 to come through the covering in order for the base portion of the seat belt to be attached. A modular/replaceable blanket can be pulled up from a lower end (i.e., non-headrest end) of the BCSA 100 and around the base child safety car seat placed in the rearward facing position. In the rearward facing orientation, the baby has greater protection from a front-end collision. In particular, the extra panel from the front seat can protect the back of the seat for a baby properly positioned within the BCSA 100 facing the traffic approaching from the rear of the vehicle.

FIG. 3 presents an example illustration of the BCSA 100 in which the headrest 108 and the collar 102 have been adjusted relative to the orientations in FIG. 2 to provide greater protection coverage for the baby's head, according to one or more embodiments. In FIG. 2, the baby 140 is wrapped in the blanket and the protective flaps 104, 106. Similarly, as illustrated in FIG. 3, the baby 140 is wrapped in the blanket and protective flaps 104, 106. In the illustration of FIG. 2, the collar 102 and the headrest 108 are positioned in a default orientation in which the collar 102 and the headrest 108 are extending in a direction that is substantially parallel to the plane of the central region 112. However, in FIG. 3, the collar 102 and the headrest 108 are adjusted by being pulled inwards towards the baby 140. In the inwardly adjusted orientation, the collar 102 and the headrest 108 are arranged to extend in a direction that is substantially perpendicular to the plane of the central region 112. According to some embodiments, the side panels 130 can be similarly adjusted by being raised.

According to some embodiments, the covering 416*b* and underlying structure of the BCSA 100 provides complete protection from side to side while side segments (i.e., the collar 102 and the side panels 130) can be pulled inward to provide added protection from a frontal direction and particularly to the head and face of a baby whose body is protected in the front by firmly extended flaps of the blanket. Although, in the example illustration of FIG. 3, the collar 102 and the headrest 108 are subjected to a ninety degree angular adjustment, various degrees greater than and less than ninety degrees are possible. Thus, the disclosure is not limited to any particular degree of angular adjustment to the collar, headrest or side panel(s).

FIG. 4 presents an example illustration of the BCSA having a number of sensors for tracking a baby's behavior, presence and environment, according to one or more embodiments. FIG. 4 provides, without the presence of the baby, a further illustration of the BCSA 100 which has been illustrated and described using FIGS. 1-3. In particular, as illustrated by FIG. 4, the BCSA 100 comprises a number of sensors including cameras & microphones 410, temperature sensor(s) 412 and weight sensor(s) 414. According to some embodiments, the BCSA 100 can include one or more moisture/wetness detection sensors 415.

Figure 5:
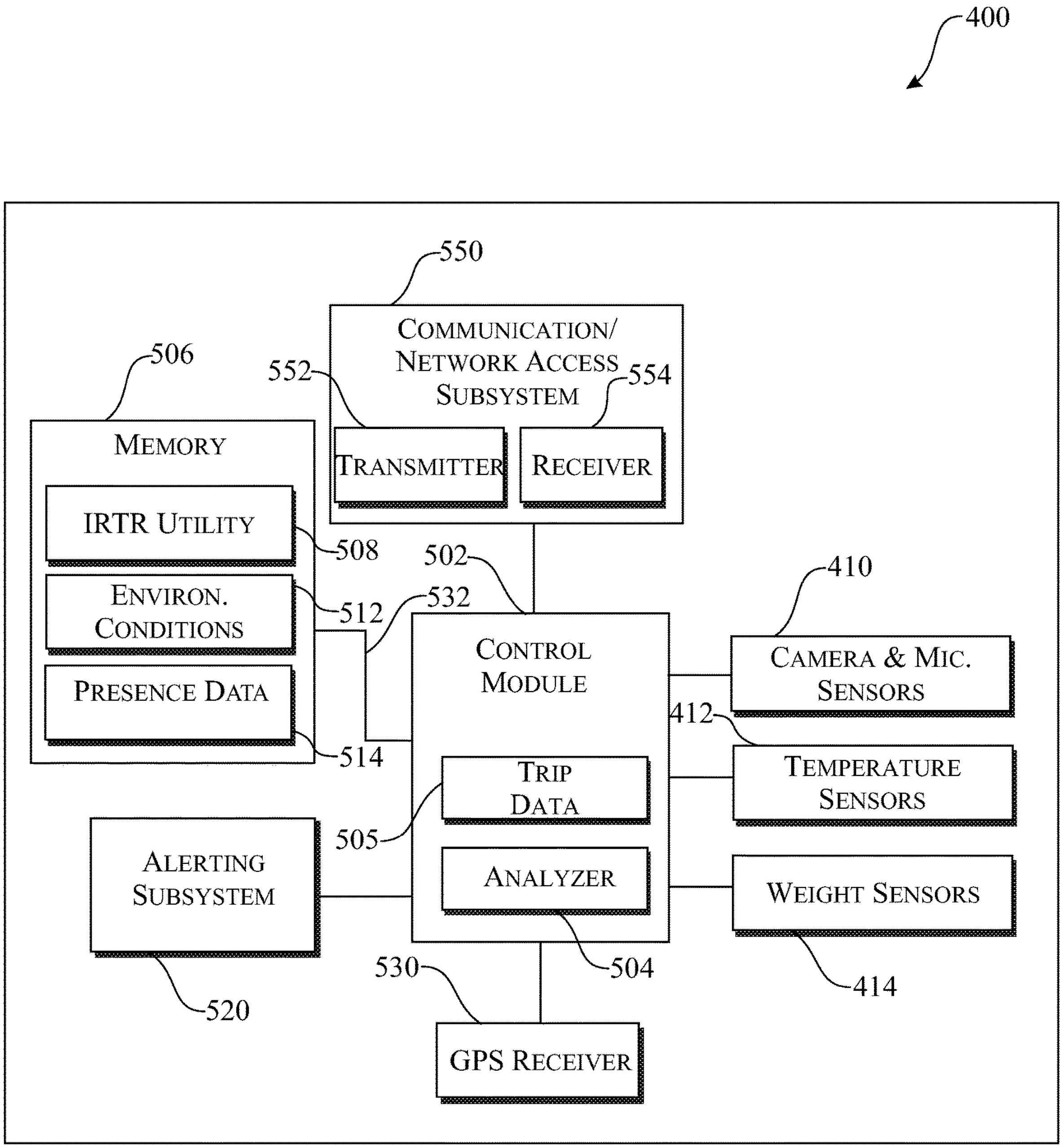
FIG. 5 illustrates a block diagram representation of an example tracking and reporting device that identifies hazards/dangers in the environment of a child seated in the BCSA and provides alerts to an appropriate individual, according to one or more embodiments of the disclosure.

Electronic circuitry can utilize these sensors, as indicated in FIG. 5. For example, the IRTR module 508 can detect wetness and alert a parent of the need for a diaper change. The IRTR module 508 may be configured to provide the alert which could inform the parent of the length of time that the baby has been wet. Thus, the IRTR module 508 can send an alert which further provides some indication of urgency and/or a need for action. The IRTR module 508 tracks the duration of a detected condition/state based on the recording of timestamps associated with various conditions detected. Thus, the IRTR module 508 is configured to determine how long an identified condition persists. According to some embodiments, the IRTR module 508 provides a parent/guardian with an ability to activate or deactivate selected features/options in order to provide a configurable set of activated features. According to a related aspect, the IRTR module 508 enables the parent/guardian to select a set of conditions for which an alert can be sent. According to some embodiments, the various sensors are securely attached to the BCSA 100 at respective locations. According to some embodiments, the camera and microphone sensing devices 410 can be attached to the side segments/panels of the BCSA 100 via an outer covering of the BCSA 100. According to some embodiments, the temperature and weight sensors 412 and 414 are embedded in the blanket or shield and can be located on an outer surface of the blanket material. Additionally, or alternatively, at least some of these sensors (410, 412, 414, 415) can be housed inside an attachable device and/or can be placed in any other location on the BCSA 100. According to some embodiments, a bullet-proof protective baby blanket 416*a*, 416*b* and the central segment are stitched/sewn together providing a seam 418 which marks/indicates a length of material proximate to a side edge of the central segment 112.

According to some embodiments, the BCSA 100 resolves or mitigates hazards/dangers that are associated with non-crash related incidents or are indirectly associated with a crash. In order to resolve or mitigate hazards/dangers, the infant risk tracking and reporting (IRTR) module 508 utilizes captured sensor data to determine a level of risk and/or potential risk of specified hazards to a baby/child transported via the BCSA 100 in a vehicle.

According to some embodiments, the IRTR module 508 uses collected sensor data to minimize hazards associated with a child being left in a vehicle/car/bus or a daycare van or any other mode/type of transportation. In particular, the IRTR module 508 limits a child's exposure to unusual or extreme or excessive temperatures within a vehicle. The IRTR module 508 establishes a normal temperature range for a baby/child. For example, in babies and children, the average/normal body temperature ranges from 97.9° F. (36.6° C.) to 99° F. (37.2° C.). The IRTR module 508 is able to configure a safe in-vehicle temperature range (e.g., between 72 degrees F. and 88 degrees F.) for a child/infant. If the IRTR module 508 determines from sensor data that the car's internal temperature exceeds the high temperature (i.e., 88 degrees Fahrenheit) of the average normal temperature range, the IRTR module 508 can provide an alert to a parent/guardian via a communication device such as a cell phone. For example, the IRTR module 508 may issue the alert to indicate that an extreme temperature which can eventually lead to a heat stroke or heat exhaustion has been detected while a baby is present in the vehicle. Similarly, if the IRTR module 508 determines from sensor data that the car's internal temperature has dropped below the low temperature (i.e., 72 degrees Fahrenheit) of the average normal temperature range, the IRTR module 508 can provide an alert to a parent/guardian via a cell phone or other communication device. For example, the IRTR module 508 may issue the alert to indicate that an extreme temperature which can eventually lead to a hypothermia has been detected while a baby is present in the vehicle. According to some embodiments, temperature sensors are positioned to measure a body temperature of the child/infant, and the IRTR module 508 is able to report unusual body temperature measurements. According to some embodiments, the IRTR module 508 determines whether the baby is present in the vehicle based on sensor/weight data indicating either the presence or absence of the baby.

According to some embodiments, the IRTR module 508 utilizes weight sensors to provide proof that the child has or has not been removed from the seat or chair. The weight of the child can be entered into the sensor. If the child is removed, a new weight will show 0 pounds present in the car seat. However, if the weight does not change for an extended/threshold period of time, an alert will immediately go to the communication device and e-mail of the selected group of individuals According to some embodiments, the camera and microphone can monitor the baby's face, full body, movement, sounds, crying, facial expressions, etc. According to some embodiments, the IRTR module 508 uses the monitored sensor data to determine if the child vomits, shows signs of distress, is choking, changes color (e.g., as in by turning blue or red), and/or any other obvious sign of distress or danger.

According to some embodiments, the IRTR module 508 can utilize the camera to capture any foreign object or danger entering the car, any threat coming near or in contact with the child or covering of BCSA 100. According to some embodiments, the IRTR module 508 enables a parent/guardian to monitor the child from the front seat and/or via an application program installed on a smartphone device, which can be connected to the circuitry and the IRTR module 508 such as by a personal area networking (PAN) link between circuitry and the smartphone device. For example, and link according to the PAN communication protocol known by the tradename BLUETOOTH can be established, allowing the smartphone device to receive information as well as to query for information. In some embodiments, the communications subsystem 550 can include a cellular data transceiver that can allow a smartphone device to access the circuitry from beyond a personal area networking range too allow a parent to monitor or view the child from a remote location.

In general, FIG. 5 illustrates a block diagram representation of an example tracking and reporting device that identifies hazards/dangers in the environment of a child seated in the BCSA and provides alerts to an appropriate individual, according to one or more embodiments of the disclosure. As illustrated, device 500 includes a control module 502 which controls operations of device 400. According to some embodiments, the control module 502 includes one or more processing devices/components (not shown). Device 500 also includes memory 506 and communication/network access subsystem 550. Additionally, device 500 includes alerting and notification subsystem 520 and Global Positioning System (GPS) receiver 530.

Figure 6:
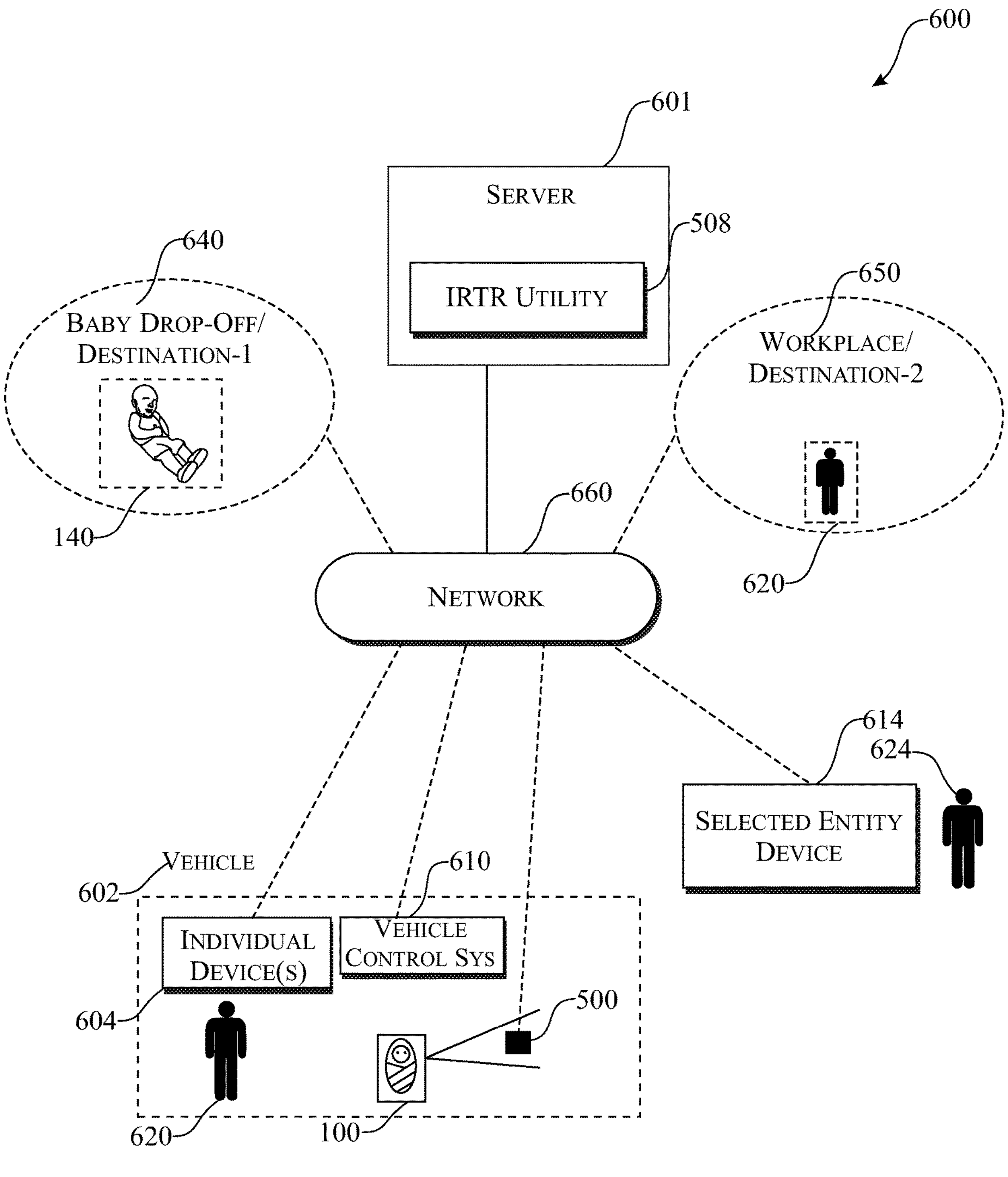
FIG. 6 illustrates a computer/communication network for configuring a tracking and reporting device and utilizing the device to track and report baby presence data and environment conditions to one or more individuals, according to one or more embodiments of the disclosure.

Memory 506 comprises infant risk tracking and reporting (IRTR) module/logic/utility 508 which supports the various functional features of device 500. In addition, memory 506 includes environment conditions data 512 and child/baby presence data 514 which can be transmitted by the device 500 to a server 601 (FIG. 6) and/or another selected entity/device 614 (FIG. 6).

As illustrated, communication/network access subsystem 550 includes transmitter 552 and receiver 554, which are collectively used to communicate with server 601 and/or selected entity/device 614. According to some embodiments, server 601 may provide control and configuration software components and information to device 500, while device 500 may provide alerts and reports to server 601.

Control module 502 comprises analyzer 504 to perform analytical functions of the device 500. In addition, the control module 502 includes trip data 505 which includes one or more of an expected start time, (expected) arrival time, vehicle/BCSA location information, and expected baby presence/absence data. According to some embodiments, the control module 502 utilizes the trip data 505 to determine whether alerts and/or reminders should be sent to one or more selected/authorized entities. According to a related aspect, selected/authorized entities can include parents or other care givers/loved ones, and then first responders such as firemen, policemen and/or other persons/entities that are authorized to respond to emergencies. The IRTR module 508 is configured to detect various emergency situations and provide an appropriate response. For example, the IRTR module 508 may initiate a 911 emergency call in response to detecting a prolonged hazardous environment surrounding the child. As a result, the police and/or other first responders will be able to address an emergency situation and offer assistance even before a first responder arrives on the scene and/or makes contact with the child. According to some embodiments, the IRTR module 508 can ensure that first responders are not alerted unless any of a pre-established set of emergency conditions/situations are detected by the BCSA 100. Thus, first responders such as the police are alerted only if the child is suspected to be in danger based on hazardous conditions being detected by the BCSA 100. According to some embodiments, the control module 502 communicates with a selected/authorized entity via an online application on which individuals can be registered to receive alerts and/or reminders.

As illustrated, device 500 comprises a number of sensors including cameras & microphones 410, temperature sensor (s) 412 and weight sensor(s) 414. According to some embodiments, the various sensors are securely attached to the BCSA 100 at respective locations. According to some embodiments, the camera and microphone sensing devices 410 are attached to the side segments/panels of the BCSA 100 via an outer covering of the BCSA 100. According to some embodiments, the temperature and weight sensors 412 and 414 are embedded in the blanket or shield and can be located on an outer surface of the blanket material. Additionally, or alternatively, at least some of these sensors (410, 412, 414) can be housed inside an attachable device and/or can be placed in any other location on the BCSA 100.

The control module 502 is communicatively coupled, via system bus/interlink 532, to device memory 506. In one or more embodiments, the control module 502 is communicatively coupled via system interlink 532 to alerting subsystem 520, communication subsystem 550, and the various sensors. System interlink 532 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components.

In actual implementation, the IRTR logic 508 may be combined with a configuration, alerting and reporting application(s) (not shown) to provide a single executable component, collectively providing the various functions of each individual component when the corresponding combined component is activated. For simplicity, the IRTR logic/utility 508 is illustrated and described as a stand-alone or separate logic/firmware component, which provides specific functions, as described below.

In one embodiment, the device 500 communicates with a software deploying server (not shown) via a network (e.g., the Internet) using communication subsystem/network access module 550. Then, IRTR utility 508 may be deployed from/on the network, via the software deploying server. With this configuration, the software deploying server performs all of the functions associated with the execution of IRTR utility 508. Accordingly, device 500 is not required to utilize internal computing resources of device 500 to execute IRTR utility 508.

Certain of the functions supported and/or provided by the IRTR utility/module 508 are implemented as processing logic (or code) executed by control module 502 and/or other device hardware, which control/processing logic enables the device to implement/perform those function(s). Among the software code/instructions/logic provided by the IRTR module 508, and which are specific to the disclosure, are: (a) logic for determining a weight sensor measurement; (b) logic for determining whether a child is securely fastened within a bullet-proof child seat apparatus (BCSA); (c) logic for tracking temperatures within an environment around the BCSA; (d) logic for determining whether a measured temperature lies within an acceptable range; (e) logic for associating a sensor measurement(s) with a timestamp or current time; (f) logic for identifying hazards/dangers to a child based on sensor data and/or timestamp information; (g) logic for sending an alert about a detected hazard/danger to a selected entity; and (h) logic for receiving trip information including one or more of an expected start time, an arrival time, location information and an expected presence/absence of a child/baby. According to the illustrative embodiment, when control module 502 executes the IRTR logic/module 508, the device 500 initiates a series of functional processes that enable the above functional features as well as additional features/functionality. These features/functionalities are described in greater detail below within the description of FIGS. 6-8.

Those of ordinary skill in the art will appreciate that the hardware components and basic configuration depicted in FIG. 5 may vary. The illustrative components within the device 500 are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

According to some embodiments, the various components of device 500 are positioned at various locations of BCSA 100. In one implementation, various components can be co-located with each other within respective component sub-groups and remain in wireless, wired and/or electronic communication with each other/sub-group via control module 502.

According to some embodiments, the BCSA 100 resolves or mitigates hazards/dangers that are associated with non-crash related incidents or are indirectly associated with a crash. In order to resolve or mitigate hazards/dangers, the infant risk tracking and reporting (IRTR) module 508 utilizes captured sensor data to determine a level of risk and/or potential risk of specified hazards to a baby/child transported in a vehicle.

According to some embodiments, the IRTR module 508 collects sensor data to minimize hazards associated with a child being left in a vehicle/car/bus or a daycare van or any other mode/type of transportation. In particular, the IRTR module 508 limits a child's exposure to unusual or extreme temperatures within a vehicle. The IRTR module 508 establishes a normal temperature range for a baby/child. For example, in babies and children, the average/normal body temperature ranges from 97.9° F. (36.6° C.) to 99° F. (37.2° C.). The IRTR module 508 is able to configure a safe in-vehicle temperature range (e.g., between 72 degrees F. and 88 degrees F.) for a child/infant. If the IRTR module 508 determines from sensor data that the car's internal temperature exceeds the high temperature (i.e., 88 degrees Fahrenheit) of the average normal temperature range, the IRTR module 508 can provide an alert to a parent/guardian via a communication device such as a cell phone. For example, the IRTR module 508 may issue the alert to indicate that an extreme temperature which can eventually lead to a heat stroke or heat exhaustion has been detected while a baby is present in the vehicle. Similarly, if the IRTR module 508 determines from sensor data that the car's internal temperature has dropped below the low temperature (i.e., 72 degrees Fahrenheit) of the average normal temperature range, the IRTR module 508 can provide an alert to a parent/guardian via a communication device such as a cell phone. For example, the IRTR module 508 may issue the alert to indicate that an extreme temperature which can eventually lead to hypothermia has been detected while a baby is present in the vehicle. According to some embodiments, the IRTR module 508 determines whether the baby is present in the vehicle based on sensor/weight data indicating either the presence or absence of the baby.

According to some embodiments, the IRTR module 508 utilizes weight sensors to provide proof the child has or has not been removed from the seat or chair. The weight of the child can be entered into the sensor. If the child is removed, a new weight will show 0 pounds present in the car seat. However, if the weight does not change for an extended/threshold period of time an alert will immediately go to the communication device and e-mail of the selected group of individuals.

According to some embodiments, the IRTR module 508 provides alerts in the form of visual and audio/verbal alert indicators. For example, the IRTR module 508 can issue an alert, such as a seat safety check alert, that indicates a safety status of a child/infant placed in the BCSA 100. According to some embodiments, the IRTR module 508 can determine a safety status based on a presence/absence of the child or infant and a hazard environment status. According to some embodiments, the IRTR module 508 signals an urgency of the alert based on one or more of a frequency of the alert, an audio intensity (e.g., by stating specifically how critical the alert is and/or rate of message repetition) and a visual intensity (e.g., using color coded messages and/or a high flashing/blinking rate of a message) of the alert. According to some embodiments, the IRTR module 508 signals the level of alert urgency by providing repeated alerts in the form of audio and visual alert messages.

According to some embodiments, the IRTR module 508 can configure the alerting module to begin sending alerts following expiration of a preset time period. Thus, the IRTR module 508 can be configured to send alerts as early as a few minutes (e.g., fifteen (15) minutes) after a child is placed in the BCSA 100. According to some embodiments, the IRTR module 508 can provide a configurable default time period after placing the child in the BCSA 100 before an alert can be issued. The configurable default time can be based on the expected travel time from a starting location to a destination. For example, if the average time for a parent to drive to his job is approximately forty-five (45) minutes, the IRTR module 508 can be configured to provide a default time period of 45 minutes or even an hour, assuming there are no other hazards, such as a temperature related hazard, detected. If the travel time to baby drop-off (e.g., daycare) is about 12 minutes or more/less, the IRTR module 508 can issue an alert in about 15 minutes (or more/less) if the driver/parent forgets to drop off the child/infant. The IRTR module 508 will provide an alert in the appropriate time frame as long as the weight bearing sensor is activated enabling a baby's presence/absence to be determined.

According to some embodiments, the IRTR module 508 can detect hazards/dangers or impending danger due to unusual/extreme temperature exposure as detected by a change in temperature inside the vehicle. Exposure due to a change in the temperature inside the vehicle can lead to a change in the child's body temperature which can be harmful to the child. The change of temperature can be a result of damage and/or breach of the windows of the vehicle due to bullets being fired at the vehicle and/or bullets shot towards the baby or making impact with the protected or shielded baby. A hazardous environment and/or an unusual body temperature can be caused by one or more of broken windows, a malfunctioned car in the winter with no heat, a car that has accidently plunged into the water, and a sick child. According to some embodiments, IRTR module 508 can alert selected individuals on a list of people to contact if the IRTR module 508 detects a hazardous environment and/or an unusual body temperature. According to some embodiments, the IRTR module 508 is able to detect hazards caused by car accidents, cars being lost, cars missing as a result of a storm and cars being stolen with the child in the vehicle. Any incident/event that damages the vehicle and/or windows can cause a change in the car's environment and the presence and/or temperature of occupant of the monitored BCSA 100.

According to some embodiments, the IRTR module 508 would alert a selected individual and/or an appropriate entity if observations made using temperature and/or heat sensors indicate that a child was left in a hot car in the summer or a cold car in the winter. It would alarm or alert the loved one in multiple ways. According to some embodiments, the IRTR module 508 uses the weight sensor(s) to determine whether the child is actually present in the vehicle. According to some embodiments, camera images can also be used to confirm a child's presence or absence in a vehicle. According to some embodiments, the IRTR module 508 can provide the alert by sending a message by way of the communication device and/or email to one or more selected individuals. According to some embodiments, the IRTR module 508 can provide an audible alarm within the car hoping to alert someone passing by of possible child danger. The audible alarm will be loud enough to be detectable to persons outside of the vehicle. According to some embodiments, the IRTR module 508 can provide a talking/verbal alarm. For example, the verbal alert may be able to utter the words "Baby Danger!" or "Baby Alert!" The IRTR module 508 can use a weight sensor to determine child presence data usable to inform a child's caretaker if the BCSA 100 is empty (e.g., a weight of zero pounds). According to some embodiments, the IRTR module 508 can utilize sensed weight data to mitigate the risks or dangers associated with kidnapping.

According to some embodiments, the camera and microphone monitors the baby's face, full body, movement, sounds, crying, facial expressions, etc. According to some embodiments, the IRTR module 508 uses the monitored sensor data to determine if the child vomits, shows signs of distress, is choking, changes color (e.g., as in by turning blue or red), and/or any other obvious sign of distress or danger.

According to some embodiments, the IRTR module 508 can utilize the camera to capture any foreign object or danger entering the car, any threat coming near or in contact with the child or covering of BCSA 100. According to some embodiments, the IRTR module 508 enables a parent/guardian to monitor the child from the front seat and/or via an online app. According to some embodiments, an absent parent can monitor or view the child from another location.

By enabling the parent to locally (i.e., from within the vehicle) or remotely (i.e., from outside of the vehicle) monitor the child, the IRTR module 508 incorporated within the BCSA 100 provides the parent with reassurance that the child is safe whether in the seat of the car or safely removed and is no longer in the car. Thus, the BCSA 100 offers reassurance, peace of mind, another level of child protection usable by the parents. According to some embodiments, the IRTR module 508 provides video footage that can be viewed at a later time to indicate how well the child tolerated the time spent in the car and/or the car's environment. The IRTR module 508 utilizes images received by a camera as an additional/indirect means of monitoring the child in order to ensure that the child is being cared for at that time.

According to some embodiments, the IRTR module 508 is configured to provide protection for the child and/or corresponding alerts even when the child is seated in the BCSA outside of the vehicle. For example, the child may continue to occupy the BCSA or a second BCSA at daycare or while in the park as his parents/guardians are picnicking. As a result, the BCSA 100 can be configured to selectively activate a specified of features which may be appropriate for the particular external environment in which the child and the BCSA 100 are placed.

According to some embodiments, IRTR module is able to mitigate hazards and/or provide protection against hazards to adults in various types of vehicles/transportation. For example, the hazards can be a result of a surrounding environment and/or to bullets being fired. In the case of protection for adults, bullet-proof blankets and/or seat coverings are manufactured in larger sizes appropriate for adults and adult-sized seats. According to some embodiments, a bullet-proof adult seat apparatus (BASA) designed for adults in adult-sized seats will have features similar or identical to the features of BCSA 100. For example, a BASA can be utilized in various types of vehicles especially military vehicles and helicopters. For an occupant of a military vehicle/helicopter, a wetness detection sensor may detect a wound as a result of bleeding and may be configured to provide an alert indicating a need for urgent action/response. According to some embodiments, a BASA can be adapted for use with a motorcycle. In this case, straps attached to the sides of the motorcycle may be used to secure a bullet-roof covering to the seat and/or seat support system. According to some embodiments, the BASA and a corresponding adult risk tracking and reporting (ARTR) module can be used to determine whether a pilot ejected safely or if a soldier is in distress and in need of help.

According to some embodiments, the BASA and ARTR module provides a seat covering for an adult, child, or baby that will have on and off options for different features. As a tracking device, the various features can be activated based on the owner's discretion and desired need.

According to some embodiments, the ARTR module can be used to provide tracking information for a missing elderly person. For example, the elderly person may have driven home, exited a vehicle at a specific time as indicated by time-stamped weight sensor information which indicates a time frame after which the elderly person may have left home and went missing.

Referring now to FIG. 6, a computer/communication network 600 for configuring a tracking and reporting device and utilizing the device to track and report baby presence data and environment conditions to one or more individuals, according to one or more embodiments of the disclosure. As illustrated in the computer network 600, a number of computing/electronic devices are included. These computing devices, which can be similarly configured to device 500 (FIG. 5), include a server 601, a parent's/driver's/individual's device(s) 604 and a selected/authorized entity device 614. According to some embodiments, an individual user device includes an I/O subsystem (not shown) having user interface devices including one or more user input devices such as a keypad and a microphone, and one or more output devices such as an audio output device(s)/speaker and a display device. Network 600 also includes a vehicle control system/device 610. Also illustrated is device 500 which may be embedded in distributed locations of BCSA 100. The various computing devices, including computers, smartphones, and other communications enabled devices are connected by a network 660. The network 660 can be any of the various networks, including a local area network (LAN) or a wide area network (WAN)/Internet.

The computer/communication network 600 allows environment conditions information 512 and presence data 514, and requests to be sent by the server to the various individuals at the respective devices. In addition, response from the various individuals can be received by the server 601. Based on the communicated/received information, the IRTR utility/module 508 can download configuration and control information to the various individual devices and reporting/tracking apparatuses, respectively.

According to some embodiments, and as illustrated in FIG. 6, driver/parent/individual 620 having the device(s) 604 are shown within a vehicle environment 602. In addition, a vehicle control system 610 and BCSA 100 are shown within vehicle environment 602. According to some embodiments, a selected/authorized entity/individual 624 having a respective individual device 614 to which alerts/reminders can be sent is located in a separate remote location. According to some embodiments, the individual devices 604/614 include a personal/laptop/tablet computer and a smart-phone.

Network 600 includes a baby/child daycare or drop-off/destination-1 area 640 at which a child/baby 140 is expected to exit the vehicle and the BCSA 100. Also illustrated in network 600 is work/destination-2 area 650 at which the parent/driver 620 is expected to arrive at a specified time based on the trip data 505.

Figure 7:
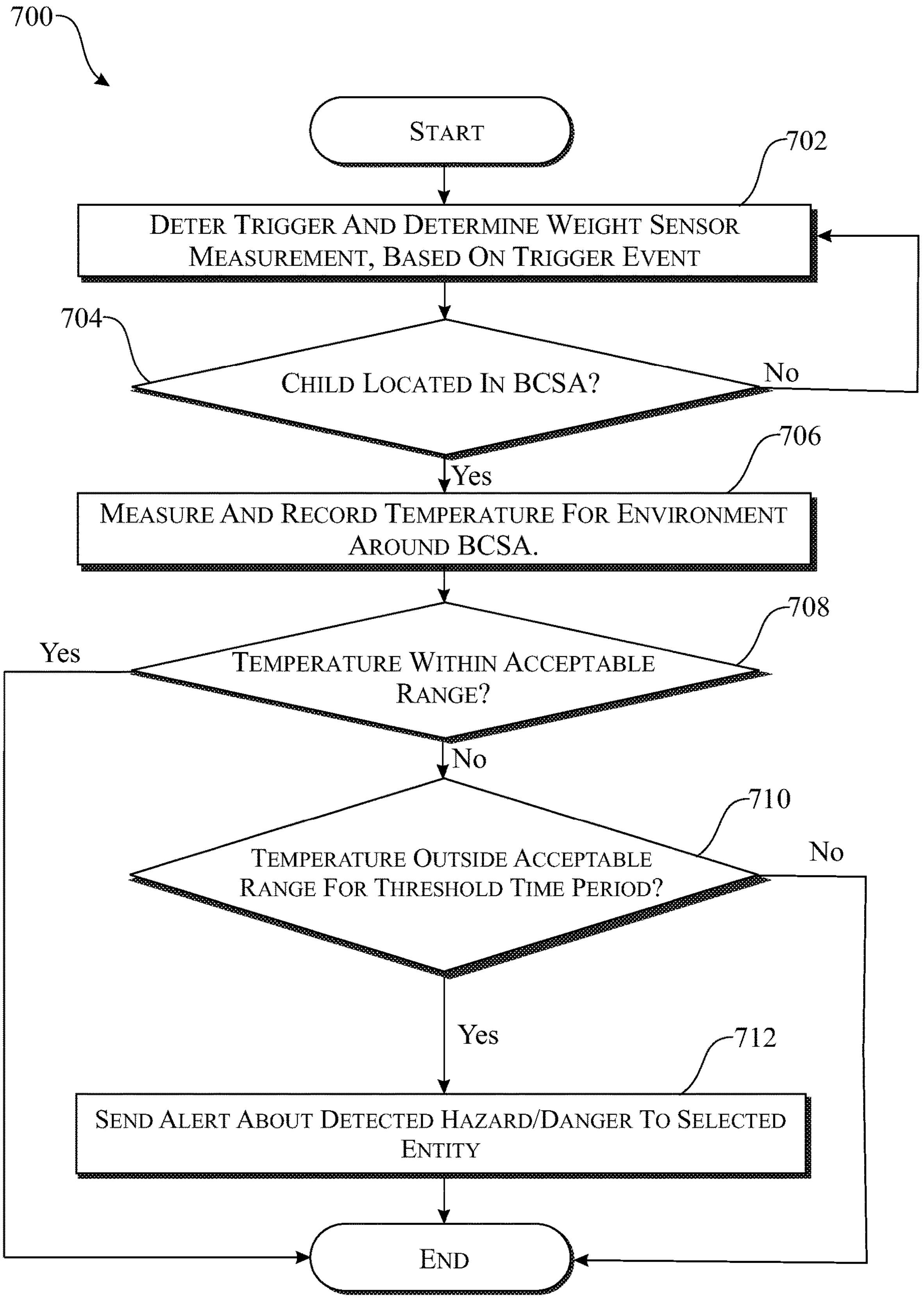
FIG. 7 presents a flow chart illustrating the process of utilizing weight sensors and temperature/heat sensors incorporated in the BCSA to determine whether a child is at risk of exposure to a hazard/danger, according to one or more embodiments.
Figure 8:
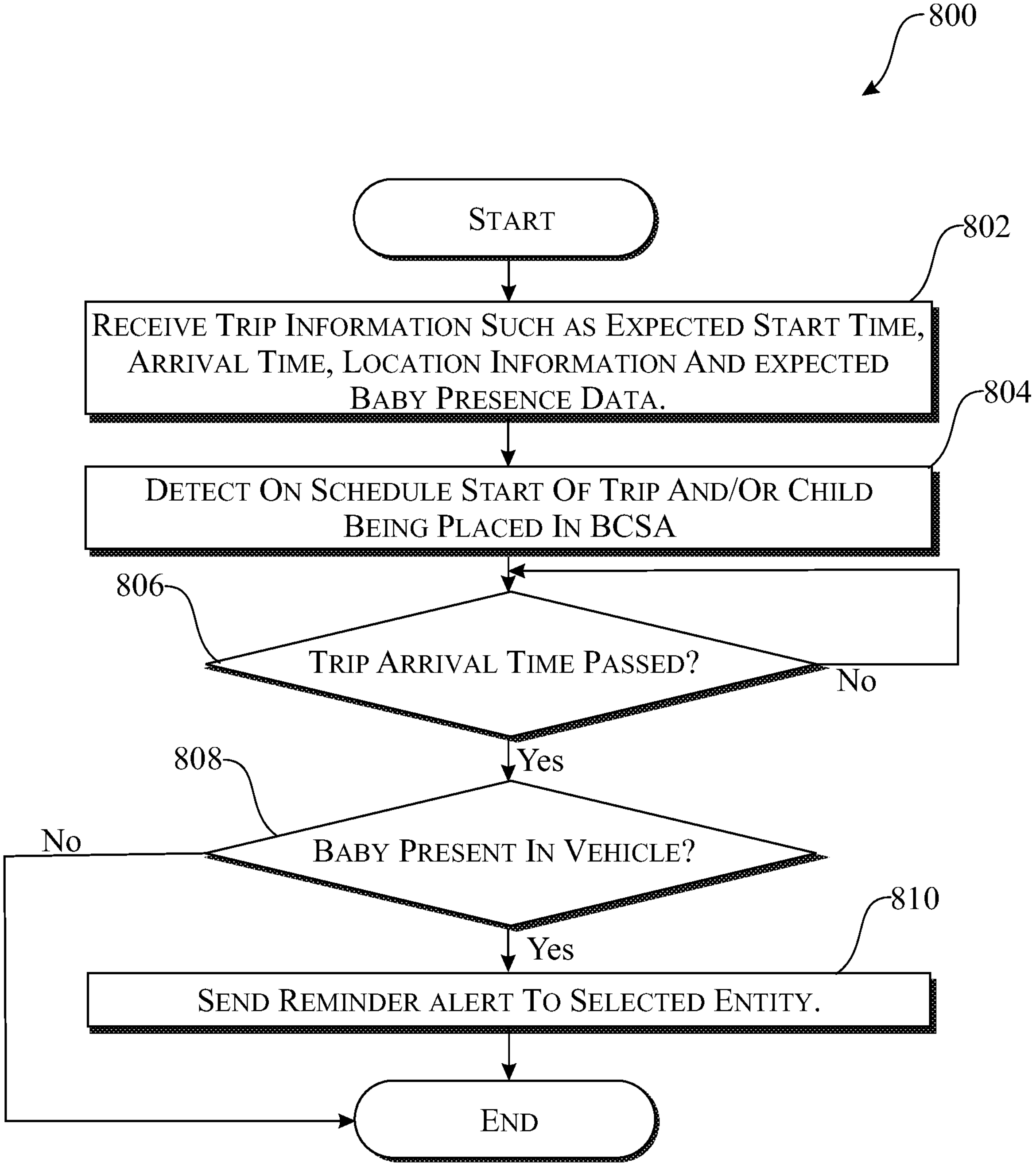
FIG. 8 presents a flow chart illustrating the process of utilizing trip data and/or information about a child's expected location/presence to provide reminders/alerts to a selected individual, according to one or more embodiments.

FIGS. 7-8 are flow charts illustrating various methods by which the above process of the illustrative embodiments is completed. Although the methods illustrated in FIGS. 7-8 may be described with reference to components shown in FIGS. 1-6, it should be understood that this is merely for convenience and alternative components and/or configurations thereof can be employed when implementing the various methods. Key portions of the methods may be completed by the infant risk tracking and reporting (IRTR) utility/module 508 executing on a control/processing module 502 within the device 500 (FIG. 5) and controlling specific operations of/on the device 500, and the methods are thus described from the perspective of either/both the IRTR module 508 and the device 500 or other device that provides the functionality associated with one or more versions of the IRTR module 508.

FIG. 7 presents a flow chart illustrating the process of utilizing weight sensors and heat sensors incorporated in the BCSA to determine whether a child is at risk of exposure to a hazard/danger, according to one or more embodiments. The process of FIG. 7 begins at the initiator/start block and proceeds to block 702, at which the IRTR module 508 detects the occurrence of one or more trigger events and determines weight sensor measurement based on the detected trigger event(s). According to some embodiments, the IRTR module 508 identifies a trigger event as one or more of a vehicle ignition turn-on/start event, detecting a status change indicating a baby/child is present/absent in/from the BCSA 100, an expected trip start time, an expected trip starting location, an expected trip ending time, an expected trip ending location, a specific time duration/expiration, specific temperature(s) detected, a particular timestamp(s), a specific location(s) and other specified events.

At decision block 704, the IRTR module 508 determines whether the child/infant is located in (i.e., securely fastened within) the BCSA 100. If the IRTR module 508 determines that the child/infant is not located in the BCSA 100, the process returns to block 702. In particular, according to an implementation, if the child/infant is not located in the BCSA 100, the process returns to block 702 after a preset delay or waiting period. If the IRTR module 508 determines that the child/infant is located in the BCSA 100, the IRTR module 508 measures and records the temperature in the environment around BCSA 100, as well as the actual time at which the temperature is measured, as shown at block 706.

At decision block 708, the IRTR module 508 determines whether the measured temperature is a value that lies within an acceptable temperature range. If the IRTR module 508 determines that the measured temperature lies within an acceptable temperature range, the process proceeds to the end block. However, if the IRTR module 508 determines that the measured temperature does not lie within an acceptable temperature range, the IRTR module 508 determines whether the measured temperature lies outside of the acceptable temperature range for a threshold time period, as shown at decision block 710. If the IRTR module 508 determines that the measured temperature does not lie outside of the acceptable temperature range for a threshold time period, the process proceeds to the end block. If the IRTR module 508 determines that the measured temperature lies outside of the acceptable temperature range for a threshold time period, the IRTR module 508 sends an alert about a detected temperature hazard/danger to a selected entity, as shown at block 712. The process then proceeds to the end block.

FIG. 8 presents a flow chart illustrating the process of utilizing trip data and/or information about a child's expected location/presence to provide reminders/alerts to a selected individual, according to one or more embodiments. The process of FIG. 8 begins at the initiator/start block and proceeds to block 802, at which the IRTR module 508 receives trip information such as an expected start time, arrival time, location information and expected baby presence data. The IRTR module 508 detects an on-schedule start of a trip and/or child being placed in the BCSA 100, as shown at block 804.

At decision block 806, the IRTR module 508 determines whether a trip's destination arrival time has passed. For example, the trip can refer to travel from a starting location to a first destination such as a daycare center or other baby drop-off location. If the IRTR module 508 determines that the trip's destination arrival time has not passed, the process returns to block 806. In particular, according to an implementation, if the trip's destination arrival time has not passed, the process returns to block 806 after a preset delay or waiting period. However, if the IRTR module 508 determines that the trip's destination arrival time has passed, the IRTR module 508 determines whether the baby is still located/present within the BCSA 100 in the vehicle, as shown at decision block 808. If IRTR module 508 determines that the baby is no longer located/present within the vehicle, the process proceeds to the end block. However, if IRTR module 508 determines that the baby is still located/present within the vehicle, the IRTR module 508 sends a reminder alert to a selected entity, as shown at block 810. The process then proceeds to the end block.

As described herein, a method and an apparatus/assembly provides enhanced protection to a baby in a child safety car seat. A bullet-proof child seat apparatus (BCSA) having a central segment that includes a seat portion and a backrest portion with a shapeable and adjustable headrest is constructed using bullet-proof covering that includes a protective blanket. Adjacent to the central segment are shapeable first and second side segments, each having a collar portion at an upper end and a side panel portion extending downward and away from the collar portion. The BCSA protects a baby fastened in place within the central segment by an enclosing bullet-proof blanket moldable around a baby's face, an outer bullet-proof material and/or a structure/chassis having a bullet-proof composition. The covering and structure provides complete protection from side to side while side segments can be pulled inward to provide added protection from a frontal direction and particularly to the head and face of a baby whose body is protected in the front by firmly extended flaps of the blanket. The BCSA also includes an infant risk tracking and reporting (IRTR) module that provides further protection by using sensors to track and report a baby's presence and surrounding environment.

According to some embodiments, the IRTR module/utility identifies hazards/dangers to a child based on sensor data and/or timestamp information. According to some embodiments, the IRTR module sends an alert about a detected hazard/danger to a selected entity.

According to some embodiments, the IRTR module receives trip information including one or more of an expected start time, an arrival time, location information and an expected presence/absence of a child/baby. According to a related aspect, the IRTR module utilizes received trip data and/or information about a child's expected location/presence to provide reminders/alerts to a selected individual.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

The claims appended hereto are meant to cover all modifications and changes within the scope and spirit of the present invention.

What is claimed is:

1. An enhanced child safety seat apparatus, comprising:

a structural central segment that includes a seat portion and a backrest portion having an adjustable headrest;

shapeable first and second structural side segments adjacent to a central segment, each side segment having a collar portion at an upper end and a side panel portion extending downward and away from the collar portion, wherein one or more of the first and second structural side segments and a headrest can be selectively oriented to adjust a protective coverage area for a child;

an outer bullet-proof covering that includes a free portion of a bullet-proof blanket that is moldable around a baby's face, wherein the free portion of the bullet-proof blanket includes one or more flaps that can be firmly extended to surround a child/infant securely placed within the enhanced child safety seat apparatus;

one or more sensors used to track a presence of the child within the enhanced child safety seat apparatus and an environment surrounding the child;

a control module; and an infant risk tracking and reporting (IRTR) module that when executed by the control module configures the control module to:

identify, using sensor data, a hazard/danger to which the child is exposed; and alert a selected individual about the identified hazard/danger.

2. The enhanced child safety seat apparatus of claim 1, wherein the one or more sensors includes a weight sensor.

3. The enhanced child safety seat apparatus of claim 1, wherein the one or more sensors includes a temperature sensor and wherein the IRTR module is configured to identify an excessive temperature.

4. The enhanced child safety seat apparatus of claim 1, wherein the one or more sensors includes a moisture sensor.

5. The enhanced child safety seat apparatus of claim 1, wherein the one or more sensors includes a camera.

6. The enhanced child safety seat apparatus of claim 1, wherein the bullet-proof blanket includes a fixed portion that is attached the structural central segment.

7. An enhanced child safety seat apparatus, comprising:
- a structural central segment that includes a seat portion and a backrest portion having an adjustable headrest;
- shapeable first and second structural side segments adjacent to a central segment, each side segment having a collar portion at an upper end and a side panel portion extending downward and away from the collar portion, wherein one or more of the first and second structural side segments and a headrest can be selectively oriented to adjust a protective coverage area for a child; and
- an outer bullet-proof covering that includes a free portion of a bullet-proof blanket that includes a face opening, wherein the free portion of the bullet-proof blanket includes one or more flaps that can be firmly extended to surround a child/infant securely placed within the enhanced child safety seat apparatus, wherein the free portion of the bullet-proof blanket is attached to a fixed portion of the bullet-proof blanket that is disposed on the structural central segment.

8. The enhanced child safety seat apparatus of claim 7, wherein the first and second structural side segments are each moveable between a lowered and a raised position.

9. The enhanced child safety seat apparatus of claim 8, wherein the collar portions of each of the first and second side segments are located proximate to a headrest of the enhanced child safety seat apparatus.

10. The enhanced child safety seat apparatus of claim 7, further comprising:
- at least one sensor including one of: a temperature sensor, a weight sensor, a moisture sensor, or a camera;
- a control module; and
- an infant risk tracking and reporting (IRTR) module that when executed by the control module configures the control module to:
  - identify, using sensor data, a hazard/danger to which the child is exposed; and
  - alert a selected individual about the identified hazard/danger.

11. The enhanced child safety seat apparatus of claim 10, wherein the at least one sensor includes a temperature sensor, and wherein the IRTR module is configured to identify an excessive temperature.

12. The enhanced child safety seat apparatus of claim 10, wherein the at least one sensor incudes a weight sensor, and wherein the IRTR module is configured to alert the selected individual that a baby is still in the enhanced child safety seat apparatus when the weight sensor indicates the baby is in the seat and a trip arrival time has passed.

13. The enhanced child safety seat apparatus of claim 7, wherein the bullet-proof blanket is comprised of para-aramid material.

14. The enhanced child safety seat apparatus of claim 7, wherein the shapeable side segments include moldable wires.

15. The enhanced child safety seat apparatus of claim 7, further including bullet-proof panels that are configured to cover at least one of a door, a window, or a trunk of a vehicle.

16. An enhanced safety seat apparatus for a vehicle, comprising:
- a structural central segment that includes a seat portion and a backrest portion;
- shapeable first and second structural side segments adjacent to a central segment, each side segment having a collar portion at an upper end and a side panel portion extending downward and away from the collar portion, wherein one or more of the first and second structural side segments can be selectively oriented to adjust a protective coverage area for a vehicle occupant; and
- an outer bullet-proof covering that includes a free portion of a bullet-proof blanket, wherein the free portion of the bullet-proof blanket includes one or more flaps that can be firmly extended to surround the vehicle occupant, wherein a fixed portion of the bullet-proof blanket disposed on the structure central segment includes a shapeable collar portions.

17. The enhanced safety seat apparatus of claim 16, wherein the free portion of the bullet-proof blanket includes a face opening.

18. The enhanced safety seat apparatus of claim 16, wherein the fixed portion includes side segments that are movable.

* * * * *